United States Patent
Liang et al.

(10) Patent No.: US 9,548,512 B2
(45) Date of Patent: Jan. 17, 2017

(54) HIGH CONDUCTING OXIDE—SULFIDE COMPOSITE LITHIUM SUPERIONIC CONDUCTOR

(71) Applicant: UT-Battelle, LLC, Oak Ridge, TN (US)

(72) Inventors: Chengdu Liang, Knoxville, TN (US); Ezhiylmurugan Rangasamy, Oak Ridge, TN (US); Nancy J. Dudney, Knoxville, TN (US); Jong Kahk Keum, Farragut, TN (US); Adam Justin Rondinone, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 109 days.

(21) Appl. No.: 14/104,803

(22) Filed: Dec. 12, 2013

(65) Prior Publication Data
US 2015/0171463 A1    Jun. 18, 2015

(51) Int. Cl.
*H01M 10/052* (2010.01)
*H01M 10/0562* (2010.01)

(52) U.S. Cl.
CPC ....... *H01M 10/052* (2013.01); *H01M 10/0562* (2013.01); *H01M 2300/0068* (2013.01); *H01M 2300/0071* (2013.01); *Y02E 60/122* (2013.01); *Y10T 29/49108* (2015.01)

(58) Field of Classification Search
CPC ............... Y10T 29/49108; H01M 2300/0071; H01M 10/0562; H01M 10/052
See application file for complete search history.

(56) References Cited

U.S. PATENT DOCUMENTS

| | | |
|---|---|---|
| 2010/0203383 A1 | 8/2010 | Weppner |
| 2011/0244337 A1 | 10/2011 | Ohta et al. |
| 2013/0164632 A1 | 6/2013 | Kato et al. |
| 2014/0287324 A1* | 9/2014 | Tsuchida ............... H01M 4/366 429/304 |

FOREIGN PATENT DOCUMENTS

| | | | |
|---|---|---|---|
| JP | 2002109955 | | 4/2002 |
| JP | 2003206111 | | 7/2003 |
| JP | 3433173 | | 8/2003 |
| JP | 2010102929 | | 5/2010 |
| JP | 201043785 | | 7/2010 |
| WO | WO2013/073214 | * | 5/2013 |

OTHER PUBLICATIONS

Allen et al., "Effect of substitution (Ta, Al, Ga) on the conductivity of Li7La3Zr2O12", Journal of Power Sources (2012) 206: 315-319.

(Continued)

*Primary Examiner* — Brittany Raymond
(74) *Attorney, Agent, or Firm* — Fox Rothschild LLP

(57) ABSTRACT

A solid electrolyte for a lithium-sulfur battery includes particles of a lithium ion conducting oxide composition embedded within a lithium ion conducting sulfide composition. The lithium ion conducting oxide composition can be $Li_7La_3Zr_2O_{12}$ (LLZO). The lithium ion conducting sulfide composition can be $\beta$-$Li_3PS_4$ (LPS). A lithium ion battery and a method of making a solid electrolyte for a lithium ion battery are also disclosed.

30 Claims, 7 Drawing Sheets

(56) References Cited

OTHER PUBLICATIONS

Awaka et al., "Synthesis and structure analysis of tetragonal Li7La3Zr2O12 with the garnet-related type structure", Journal of Solid State Chemistry (2009) 182(8): 2046-2052.
Bruce et al., "Li—O2 and Li—S batteries with high energy storage", Nature Materials (2011) 11(1): 19-29.
Dudney, "Composite Electrolytes", Annual Review of Materials Science (1989) 19: 103-120.
Dudney, "Effect of Interfacial Space-Charge Polarization on the Ionic-Conductivity of Composite Electrolytes", Journal of the American Ceramic Society (1985) 68(10): 538-545.
Dudney, "Enhanced Ionic-Conductivity in Composite Electrolytes", Solid State Ionics (1988) 28: 1065-1072.
Geiger et al., "Crystal Chemistry and Stability of "Li7La3Zr2O12" Garnet: A Fast Lithium—Ion Conductor", Inorganic Chemistry (2011) 50(3):1089-1097.
Ji et al., "Advances in Li—S batteries", Journal of Materials Chemistry (2010) 20(44): 9821-9826.
Jin et al., "Al-doped Li7La3Zr2O12 synthesized by a polymerized complex method", Journal of Power Sources (2011) 196(20): 8683-8687.
Kamaya et al., "A lithium superionic conductor", Nature Materials (2011) 10(9): 682-686.
Kanno et al., "Lithium ionic conductor thio-LISICON—The Li2SGeS2—P2S5 system", Journal of the Electrochemical Society (2001) 148(7): A742-A746.
Knauth, "Inorganic solid Li ion conductors: An overview", Solid State Ionics (2009) 180(14-16): 911-916.
Liang, "Conduction Characteristics of Lithium Iodide Aluminum Oxide Solid Electrolytes", Journal of the Electrochemical Society (1973) 120(10): 1289-1292.
Liang et al., "Hierarchically structured sulfur/carbon nanocomposite material for high-energy lithium battery", Chem. Mater. (2009) 21: 4724-4730.
Lin et al., "Lithium Superionic Sulfide Cathode for All-Solid Lithium—Sulfur Batteries", ACS Nano (2013) 7(3): 2829-2833.
Liu et al., "Anomalous High Ionic Conductivity of Nanoporous β-Li3PS4", Journal of the American Chemical Society (2013) 135(3): 975-978.
Maier, "Ionic conduction in space charge regions", Progress in Solid State Chemistry (1995) 23(3): 171-263.
Maier, "Nanoionics: ion transport and electrochemical storage in confined systems", Nature Materials (2005) 4(11): 805-815.
Maier, "Space-Charge Regions in Solid 2 Phase Systems and Their Conduction Contribution .2. Contact Equilibrium at the Interface of 2 Ionic Conductors and the Related Conductivity Effect", Berichte Der Bunsen-Gesellschaft-Physical Chemistry Chemical Physics (1985) 89(4): 355-362.
Maier, "Space-Charge Regions in Solid 2-Phase Systems and Their Conduction Contribution .1. Conductance Enhancement in the System Ionic Conductor-Inert Phase and Application on Agcl—Al2o3 and Agcl—Sio2", Journal of Physics and Chemistry of Solids (1985) 46(3): 309-320.
Maier, "Space-Charge Regions in Solid 2-Phase Systems and Their Conduction Contribution .3. Defect Chemistry and Ionic-Conductivity in Thin-Films", Solid State Ionics (1987) 23(1-2): 59-67.
Mo et al., "First Principles Study of the Li10GeP2S12 Lithium Super Ionic Conductor Material", Chemistry of Materials (2012) 24(1): 15-17.
Murugan et al., "Fast lithium ion conduction in garnet-type Li7La3Zr2O12", Angewandte Chemie-International Edition (2007) 46(41): 7778-7781.
Ni et al., "Room temperature elastic moduli and Vickers hardness of hot-pressed LLZO cubic garnet", Journal of Materials Science (2012) 47(23): 7978-7985.
Ohta et al., "Enhancement of the high-rate capability of solid-state lithium batteries by nanoscale interfacial modification", Adv. Mater. (2006) 18: 2226-2229.
Ohta et al., "High lithium ionic conductivity in the garnet-type oxide Li7—X La-3(Zr2—X, Nb—X)O-12 (X=0-2)", J Power Sources (2011) 196(6): 3342-3345.
Rangasamy et al., "The effect of 24c-site (A) cation substitution on the tetragonal-cubic phase transition in Li(7-x)La(3-x)A(x)Zr(2)O(12) garnet-based ceramic electrolyte", Journal of Power Sources (2013) 230: 261-266.
Rangasamy et al., "The role of Al and Li concentration on the formation of cubic garnet solid electrolyte of nominal composition Li7La3Zr2O12", Solid State Ionics (2012) 206: 28-32.
Takada, "Progress and prospective of solid-state lithium batteries", Acta Materialia (2013) 61(3): 759-770.
Tarascon et al., "Issues and challenges facing rechargeable lithium batteries", Nature (2001) 414(6861): 359-367.
Wolfenstine et al., "High conductivity of dense tetragonal Li7La3Zr2O12", Journal of Power Sources (2012) 208: 193-196.

* cited by examiner

FIGURES 1 (a) – (d)

HIGH CONDUCTING OXIDE—SULFIDE COMPOSITE LITHIUM SUPERIONIC CONDUCTOR

STATEMENT REGARDING FEDERALLY SPONSORED RESEARCH

This invention was made with government support under contract No. DE-AC05-00OR22725 awarded by the U.S. Department of Energy. The government has certain rights in this invention.

FIELD OF THE INVENTION

This invention relates generally to lithium batteries, and more particularly to solid electrolytes for lithium batteries.

BACKGROUND OF THE INVENTION

Since its introduction in 1991, modern Li-ion battery technology has found a wide range of applications from portable electronics to transportation systems. Due to the increasing demand on advanced energy storage devices, high energy density technologies such as Li—S and Li—$O_2$ are now being extensively researched. Li—S cells offer a 6-fold increase in specific energy over conventional Li-ion systems. Their implementation is currently limited by the dissolution and migration of polysulfides in conventional liquid electrolytes. The polysulfide shuttle phenomenon leads to a decrease in columbic efficiency and rapid electrode degradation. In addition, cycling a metallic lithium anode in liquid electrolyte raises safety concerns due to the dendrite-caused internal cell shorting and high flammability of organic solvents.

Solid state Li-ion conductors offer a solution to these issues by providing a typically impermeable membrane that prevents the penetration of lithium dendrites and the migration of polysulfides. Additionally, they offer improved electrochemical, mechanical and thermal stability. Ionic conductivity of solid electrolytes can be as high as liquid electrolytes with concentrated salts. For example, the sulfide based $Li_{10}GeP_2S_{12}$ has an unprecedented ionic conductivity of $1.2 \times 10^{-2}$ S $cm^{-1}$ which is comparable to that of 1M $LiPF_6$ in the carbonate solvents.

Solid electrolytes are single ion conductors; the lithium ion transference number is 1. With comparable ionic conductivities, the effective lithium-ion conductivity of solid electrolytes is much higher than that of liquid electrolytes. However a majority of the solid state conductors suffer from poor ionic conductivity ($10^{-6}$ to $10^{-8}$ S $cm^{-1}$), while the better ionic conductors are not stable with metallic Li anodes.

The practical use of solid electrolytes in batteries extends beyond the investigation of ionic conductivity. Chemical compatibility of solid electrolytes with electrode materials, interfacial resistance, and processablity of the solid electrolytes restrict the deployment of solid electrolytes in batteries. Thus, it is very challenging to have a single electrolyte that meets all above requirements for practical use in batteries.

SUMMARY OF THE INVENTION

A solid electrolyte for a lithium sulfur battery includes particles of a lithium ion conducting oxide composition embedded within a lithium ion conducting sulfide composition. The lithium ion conducting oxide composition can comprise $Li_7La_3Zr_2O_{12}$ (LLZO). The lithium ion conducting sulfide composition can comprise $\beta$-$Li_3PS_4$ (LPS).

The lithium conducting oxide composition can be at least one selected from the group consisting of (i) perovskite-type oxides; (ii) NASICON-structured lithium electrolytes; and (iii) garnet-type structures containing transition metal oxides. The perovskite-type oxides can comprise (Li,La)$TiO_3$. The NASICON-structured lithium electrolytes can comprise $LiM_{IV2}(PO_4)_3$ (MIV=Ti, Zr, Ge). The garnet-type structures containing transition metal oxides can comprise $Li_5La_3M_2O_{12}$ (M=transition metal).

The lithium ion conduction sulfide composition can be at least one selected from the group consisting of $Li_2S$—$P_2S_5$ glass or glass-ceramic, $Li_2S$—$P_2S_5$—$Li_4SiO_4$ glass, $Li_2S$—$SiS_2$ glass, $Li_2S$—$Ga_2S_3$—$GeS_2$ glass, $Li_2S$—$Sb_2S_3$—$GeS_2$ glass, $Li_2S$—$GeS_2$—$P_2S_5$ glass, $Li_{10}GeP_2S_{12}$, $Li_{10}SnP_2S_{12}$, and $Li_2S$—$SnS_2$—$As_2S_5$ glass or glass-ceramic.

The lithium ion conducting oxide particles can form a core and are coated by a shell of the lithium ion conducting sulfide composition. The solid electrolyte can be $Li_7La_3Zr_2O_{12}$ (LLZO) embedded within $\beta$-$Li_3PS_4$ (LPS). The particles of lithium ion conducting oxide composition can be between 0.001 and 50 microns in largest diameter.

The lithium ion conducting oxide composition can comprise between 1-99 weight % of the solid electrolyte. The lithium ion conducting sulfide composition can comprise between 1-99 weight % based on the total weight of the solid electrolyte.

A lithium sulfur battery includes an anode comprising lithium, a cathode comprising sulfur, and a solid electrolyte. The solid electrolyte comprises particles of a lithium ion conducting oxide composition embedded within a lithium ion conducting sulfide composition.

A method of making a lithium battery includes the steps of providing a lithium ion conducting oxide composition, providing a lithium ion conducting sulfide composition, embedding the lithium ion conducting oxide particles within the lithium ion conducting sulfide composition, and forming a solid electrolyte comprising the lithium ion conducting oxide particles and the lithium ion conducting sulfide composition.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
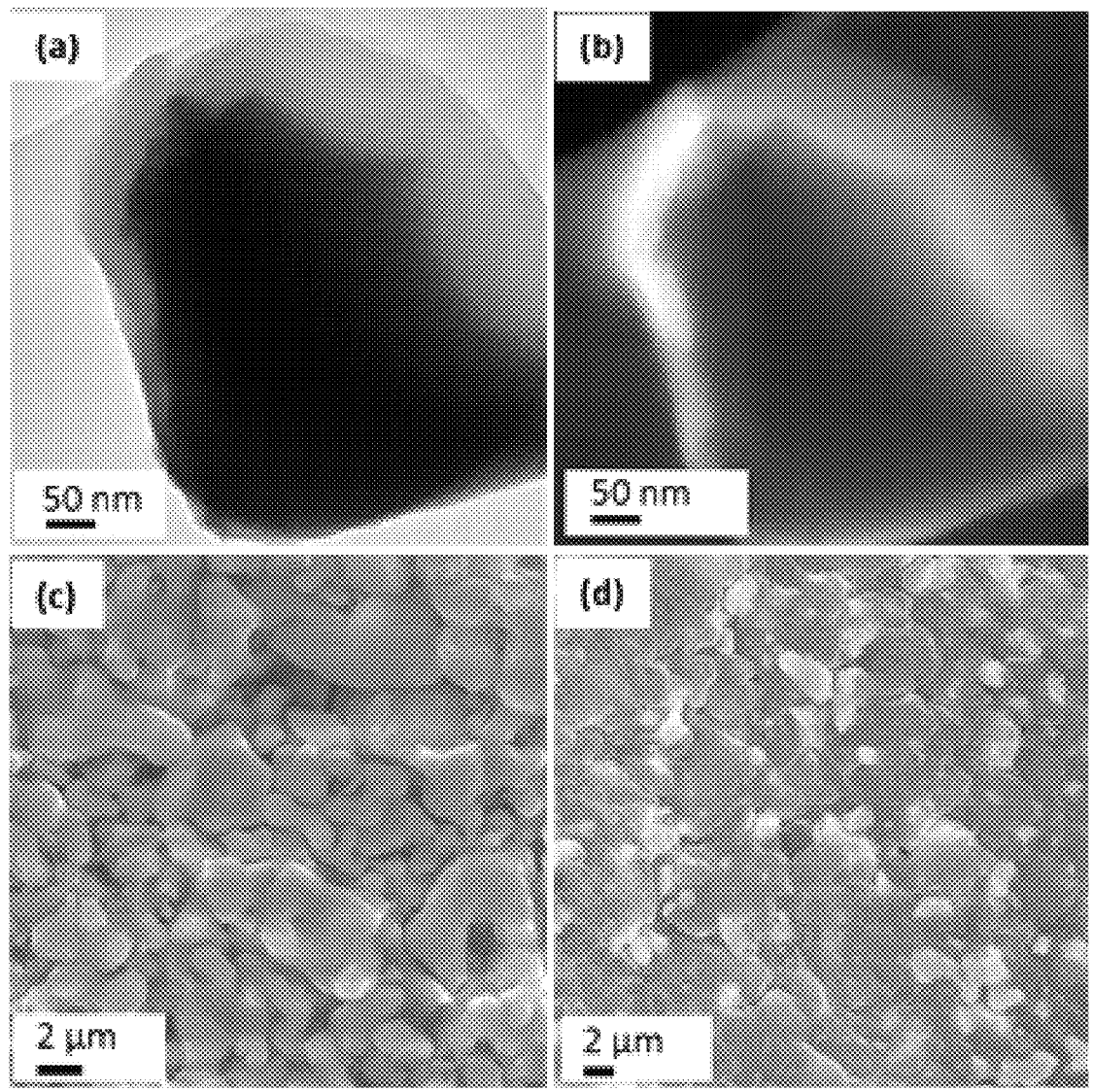
FIGS. 1 (*a*)-(*d*) are (*a*) a TEM image of the LLZO-LPS (nanocrystalline) composite electrolyte; (*b*) an EELS map; (*c*) an SEM image of the cold-pressed LLZO; and (*d*) an SEM image of the cold-pressed composite electrolyte.

A solid electrolyte for a lithium sulfur battery includes particles of a lithium ion conducting oxide composition embedded within a lithium ion conducting sulfide composition.

The lithium ion conducting oxide composition can comprise $Li_7La_3Zr_2O_{12}$ (LLZO). The lithium conducting oxide composition can be any suitable lithium conducting oxide composition. The lithium conducting oxide composition can include (i) perovskite-type oxides, such as $(Li,La)TiO_3$; (ii) NASICON-structured lithium electrolytes, such as $LiM_{IV2}(PO_4)_3$ (MIV=Ti, Zr, Ge); (iii) garnet-type structures containing transition metal oxides, which include $Li_5La_3M_2O_{12}$ (M=transition metal).

The lithium ion conducting sulfide composition can comprise $\beta$-$Li_3PS_4$ (LPS). The lithium ion conducting sulfide composition can be any suitable lithium ion conducting sulfide composition. The lithium ion conducting sulfide composition can include $Li_2S$—$P_2S_5$ glass or glass-ceramic, $Li_2S$—$P_2S_5$—$Li_4SiO_4$ glass, $Li_2S$—$SiS_2$ glass, $Li_2S$—$Ga_2S_3$—$GeS_2$ glass, $Li_2S$—$Sb_2S_3$—$GeS_2$ glass, $Li_2S$—$GeS_2$—$P_2S_5$ glass, $Li_{10}GeP_2S_{12}$, $Li_{10}SnP_2S_{12}$, and $Li_2S$—$SnS_2$—$As_2S_5$ glass or glass-ceramic.

The conductivity of the lithium ion conducting oxide composition is at least $1.0\times10^{-8}$ S/cm. The conductivity of the lithium ion conducting sulfide composition is at least $1.0\times10^{-8}$ S/cm.

The solid electrolyte of the invention in one embodiment comprises a lithium ion conducting oxide composition comprising $Li_7La_3Zr_2O_{12}$ (LLZO), and a lithium ion conducting sulfide composition comprising $\beta$-$Li_3PS_4$ (LPS).

The lithium ion conducting oxide particles are embedded within the lithium ion conduction sulfide particles. The term "embedded" as used herein means that the lithium ion conducting oxide particles are surrounded or otherwise encapsulated by the lithium ion conducting sulfide particles. The lithium ion conducting oxide particles can form a core and can be coated by a shell of the lithium ion conducting sulfide composition. The particles of lithium ion conducting oxide composition are between 0.001 and 50 microns in largest diameter. The particles can be any shape.

The proportions of lithium ion conduction oxide composition and lithium ion conducting sulfide composition can vary. The lithium ion conducting oxide composition can comprise between 1-99 weight % and the lithium ion conducting sulfide composition can comprise between 1-99 weight % based on the total weight of the electrolyte, and any range of any high or low value within these ranges.

A lithium sulfur battery or other kind of lithium battery according to the invention has an anode, a cathode, and a solid electrolyte. The solid electrolyte includes particles of a lithium ion conducting oxide composition embedded within a lithium ion conducting sulfide composition. The lithium ion conducting oxide composition can comprise $Li_7La_3Zr_2O_{12}$ (LLZO). The lithium ion conducting sulfide composition can comprise $\beta$-$Li_3PS_4$ (LPS).

The anode comprises lithium. The anode can be Si, $SiO_x$, Sn, $SnO_x$, Ge, $GeO_x$, and/or any combination of these materials. Other anodes are possible.

The cathode comprises at least one sulfur compound. Then cathode can be of any suitable construction. The cathode can be sulfur, metal oxides, metal sulfides, and metal phosphates. Other cathodes are possible.

A lithium battery according to the invention can be made by any suitable method. A lithium ion conducting oxide composition and a lithium ion conducting sulfide composition can be provided. The lithium ion conducting oxide composition and the lithium ion conducting sulfide composition are combined such that lithium ion conducting oxide particles are embedded within the lithium ion conducting sulfide composition. A solid electrolyte comprising the lithium ion conducting oxide particles within the lithium ion conducting sulfide composition can then be formed by any suitable method such as ball milling, dry-coating, or solution based coating methods. The lithium sulfur battery can be assembled with the electrolyte of the invention according to any suitable method.

The garnet structured $Li_7La_3Zr_2O_{12}$ (LLZO) and the nanoporous $\beta$-$Li_3PS_4$ (LPS) are two promising electrolytes with their own cons and pros for using in batteries. LLZO combines good ionic conductivity ($>10^{-4}$ S cm$^{-1}$) with excellent electrochemical stability and mechanical properties. Despite these advantages, the LLZO requires doping to stabilize the higher conducting cubic phase and higher temperatures ($>1000°$ C.) to achieve high relative densities ($>95\%$) via sintering. LLZO processed at ambient conditions via cold pressing does not possess the excellent ionic conductivity of hot pressed membranes because of the high resistance from grain boundaries and porosity. It also suffers from high interfacial resistances with the electrodes. The nanoporous LPS is a superionic conductor offering good electrochemical stability and favorable ionic conductivity. Due to the negligible grain boundary resistance for sulfide electrolytes, LPS exhibits excellent conductivity even under cold pressed conditions. These sulfides can be dry-pressed to high relative densities at ambient conditions. The performance of LPS in a non-blocking electrode configuration is excellent, indicating minimal interfacial resistance with the electrodes. Thus, LPS combines good electrochemical properties, a facile synthesis procedure, and an easy membrane fabrication. However the bulk room-temperature conductivity of the LPS at $1.6\times10^{-4}$ S cm$^{-1}$ leaves scope for improvement. The invention provides a composite superionic conductor utilizing an oxide-sulfide system that enhances the properties of its parent electrolytes: (1) excellent processability through cold pressing; (2) enhanced ionic conductivity; and (3) high chemical compatibility and low interfacial resistance with metallic lithium anode.

The $Li_3PS_4$ can be synthesized through a solution based procedure or by any suitable process. See Z. Liu, W. Fu, E. A. Payzant, X. Yu, Z. Wu, N. J. Dudney, J. Kiggans, K. Hong, A. J. Rondinone, C. Liang, *Journal of the American Chemical Society* 2013, 135, 975-978, the disclosure of which is incorporated fully by reference. The synthesized $Li_3PS_4$ was heat treated at 140° C. for 1 hour to obtain the nano-crystalline $\beta$-$Li_3PS_4$ (LPS). LLZO was homemade. The precursors for the LLZO are the following: $Li_2CO_3$—Acros International 99.999% pure, $La_2O_3$—Acros International (US branch) 99.9% pure, $ZrO_2$—Inframat Advanced Materials 99.9% pure 30-60 nm, $Al_2O_3$—Sigma Aldrich <50 nm. The precursors were mixed (8000M Spex Mixer Mill) in the molar ratio 3.5:1.5:2:0.12 in a 30 ml High Density Poly-Ethylene (HDPE—VWR Scientific) vial for 1 hour. Agate balls (5 mm diameter) were used as the milling media. The milled powders are collected and cold pressed in a 1" Steel Die at 40 Mpa. The precursor mixtures were cold pressed into pellets and followed by calcination at 1000° C. for 8 hours with a heating rate of 250° C./hour. A $MgO_2$ crucible was used as the calcination media. The fired LLZO was ground to fine powder by mortar and pestal. Since LLZO was prepared in air, possible moisture uptake was removed by heating the LLZO powder in vacuum at 160° C. for 2 hours prior to the preparation of the composite. Tetragonal LLZO was synthesized through the aforementioned procedure without $Al_2O_3$. For the preparation of composite electrolyte, the LLZO and LPS precursors are mixed (Mixer Mill) in the requisite ratios in a HDPE vial with 2 mm diameter $ZrO_2$ milling media (1:50 mass ratio) for 3 minutes.

Structural and Electrochemical Characterization. Crystallographic phase identification was conducted by using a PANalytical X'Pert Pro Powder Diffractometer with Cu Kα radiation. XRD samples were prepared in a glove box with Ar atmosphere. Kapton® (DuPont) films were used to seal the quartz slide to exclude air contact. Rietveld refinement and structural analyses were conducted by the software of HighScore Plus, which is developed by PANalytical. The powder samples were cold pressed into pellets (0.5" Dia) in a steel die at 600 Mpa inside an Ar atmosphere. Carbon coated Al-foils were used as blocking electrodes. Electrochemical Impedance Spectrocopy (EIS) measurements were conducted at 100 mV amplitude in the frequency range of 1 MHz to 1 Hz using a Solartron 1260 Frequency Response Analyzer. For the preparation of the Li/LLZO-LPS/Li symmetric cell, the powders were cold pressed along with Li foils at 300 Mpa in 0.5" die. The cycling measurements were conducted at a current density of 0.1 mA cm$^{-2}$ by using a MACCOR 4000 battery tester. Arrhenius measurements were conducted between 25° C. and 100° C. with the temperature controlled by an environmental chamber. Each temperature point was equilibrated for 60 mins before the impedance measurement. The cyclic voltammetry measurements were conducted between −0.2 V to 5 V vs Li/Li$^+$ using a scan rate of 10 mV s$^{-1}$. The cell was fabricated using a Pt working electrode and a Li counter electrode cold pressed with the composite powders at 300 Mpa in a 0.5" die. The Li counter electrode was employed as the quasi-reference electrode.

LLZO is a hard oxide crystal, which is impossible to densify at room temperature through hydraulic pressing. The high ionic conductivity of LLZO cannot be achieved without sintering or hot pressing at a temperature below 1000° C., which restricts the use of this material in batteries due to the processing cost. The sulfide based solid electrolytes are relatively soft. Dense materials with high ionic conductivity are attainable through cold-pressing of sulfide-based electrolytes. A simple ball-milling procedure or other suitable process can be applied to the mixture of LLZO and LPS particles. The mechanical mixing of these two materials results in a coating of LPS over LLZO by taking the advantage of the soft and sticky nature of the sulfides. Thus by employing a simple dry milling procedure, a core-shell structure is obtained as shown in FIG. 1(a). The Li distribution data shown in FIG. 1(b) from Electron Energy Loss Spectroscopy (EELS) imaging confirms a Li-rich shell of LPS arising from the higher molar concentration of Li in LPS vs. LLZO. FIG. 1 (b) shows a higher Li concentration across the LLZO-LPS interface. The bright part of the image indicates a higher concentration of Li. La and Zr distribution data provided complementary information to the Li data confirming a LLZO core. XRD analysis of the synthesized powder and the prepared composites shown in FIG. 2 clearly indicate that there are no chemical/crystallographic changes during the milling procedure. This observation rules out the possibility of a solid-state reaction between the LLZO and the LPS. Further, Rietveld analysis of the parent electrolytes estimated the samples to be near phase purity (LLZO—98.1%, $Li_2Zr_2O_7$ 1%, $LiAlO_3$ 0.8% and LPS—99.2%, $Li_2S$—0.8%), while the phase compositions of the composite electrolyte were estimated at 81.8% LPS and 18.2% LLZO for an 80:20 mixture. The analysis also confirmed the absence of any contamination from the milling media ($ZrO_2$). The stress, strain and particle size properties of the parent electrolytes were derived to be unchanged in the composite electrolyte, thus confirming the absence of structural or chemical changes during the composite preparation.

LLZO under the cold-press condition yields a pellet that contains a significant amount of open porosity shown in FIG. 1(c) and does not maintain its structural integrity under mechanical stress. As a result, this pellet suffers from lower ionic conductivity and a lack of structural stability. The mechanical processing of the LLZO along with the soft and sticky LPS results in a sticky LPS shell over the hard LLZO core as shown in FIG. 1(a). This sticky shell significantly improves in the particle-particle adhesion and hence the materials processability of LLZO. The addition of LPS, as little as 10% wt., aids in improving the structural stability of the fabricated membrane. FIG. 1 (c) is an SEM image of the cold-pressed LLZO showing evident open porosity. This improvement is seen in the difference between the blank LLZO membranes shown in FIG. 1(c) and the 70:30 (LPS: LLZO) membranes as shown in FIG. 1(d). FIG. 1 (d) is an SEM image of the cold-pressed composite electrolyte which illustrates the improvement in processability to a dense membrane. Membranes with the addition of LPS result in a significant reduction in the porosity at higher weight fractions of LPS (>50%). The 70:30 membranes are extremely dense membranes with no observed open porosity which is in contrast to the blank LLZO. Thus the composite electrolyte vastly improves the room temperature processability of LLZO.

Figure 2:
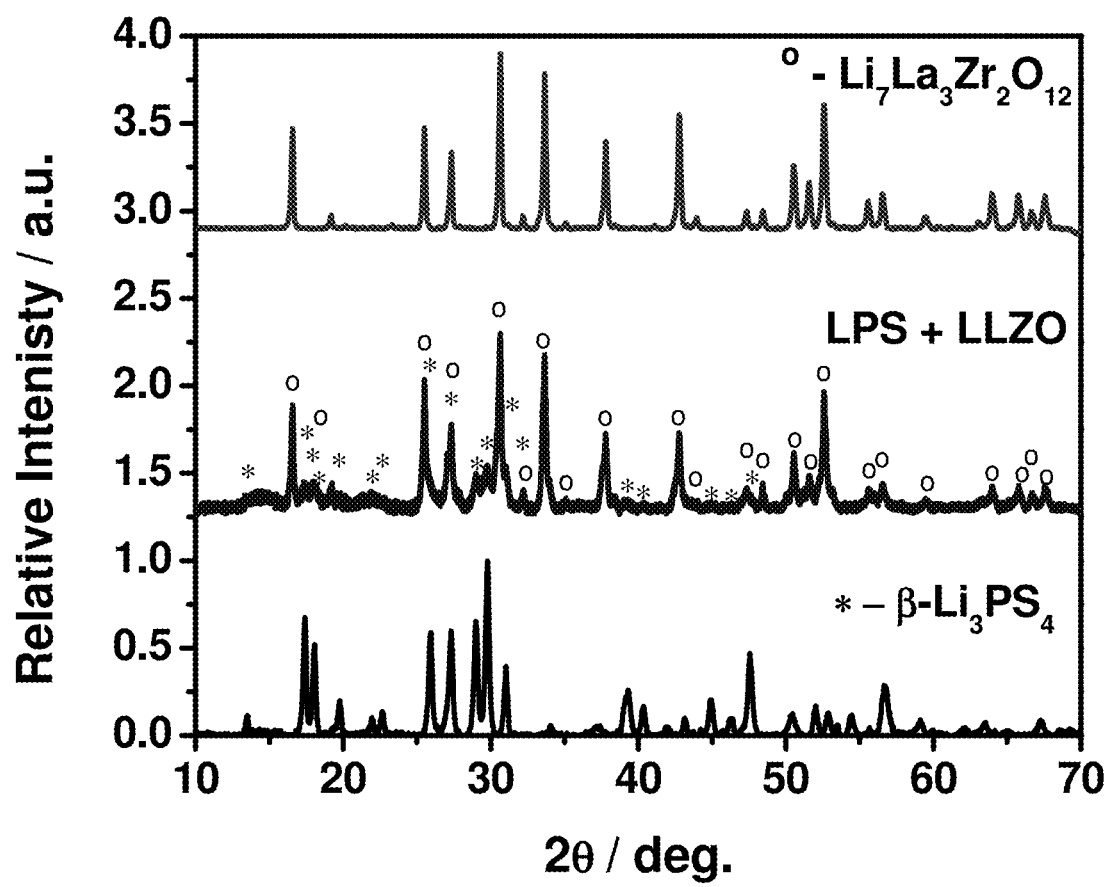
FIG. 2 is XRD spectra of a LLZO:LPS composite.

FIG. 2 is XRD spectra which confirms that no chemical reaction between the LLZO and the LPS. All peaks in the composite were identified as from its parent electrolytes.

Figure 3:
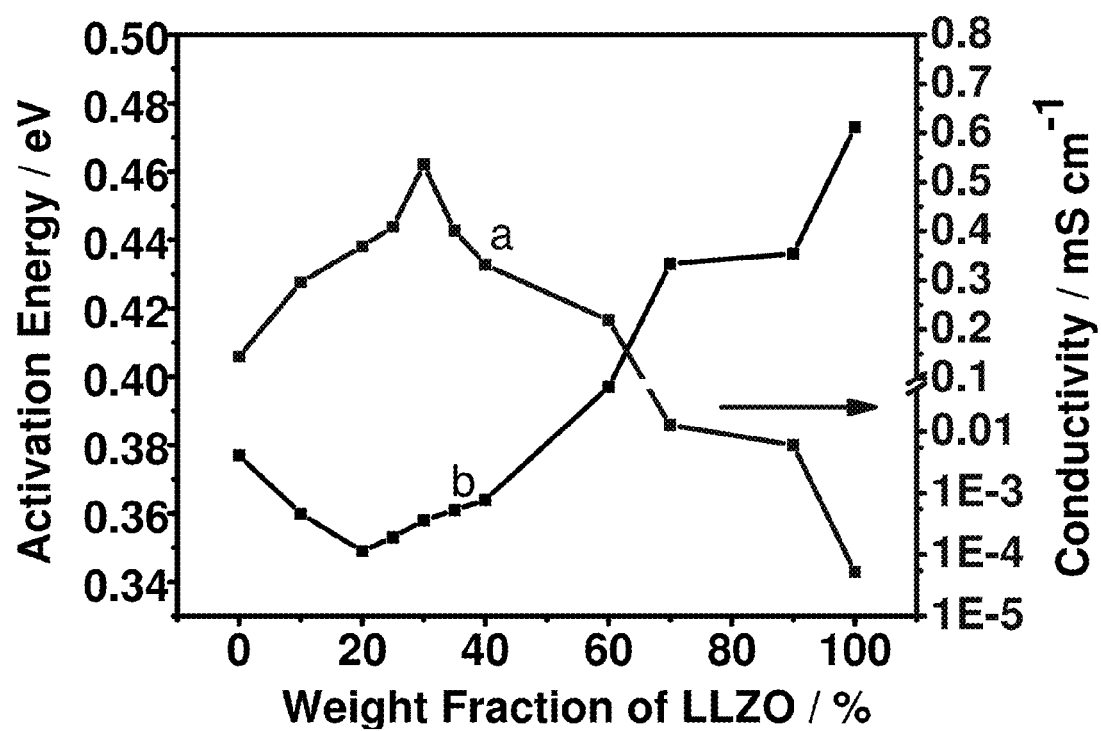
FIG. 3 is a plot of ionic conductivity (right y-axis) and activation energy (left y-axis) as a function of the weight fractions of LLZO in the LLZO:LPS composite.

The LPS-LLZO composite possesses an ionic conductivity higher than its parent components. The maximum Li-ion conductivity of 5.36×10$^{-4}$ S cm$^{-1}$ is measured at the 70:30 (LPS:LLZO) composition, while the samples with ≤40 wt. % LLZO exhibit ionic conductivity greater than the parent LPS electrolyte (FIG. 3). The maximum conductivity of the composite is greater than the individual conductivities of LPS (1.6×10$^{-4}$ S cm$^{-1}$) and LLZO (4.0×10$^{-4}$ S cm$^{-1}$). Activation energies calculated from the Arrhenius measurements and shown in FIG. 3 line b reveal a contrasting behavior to the conductivity. Activation energy starts increasing for samples beyond 20 wt. % of LLZO. The activation energies for the higher conducting samples (>40% LPS) range between 0.349 eV to 0.397 eV, falling within the range of the reported values for LPS (0.356 eV) and the sintered Al-doped cubic LLZO 0.26-0.34 eV. The trend of increase in the activation energy is due to the inclusion of higher weight fractions of non-sintered LLZO. The absence of well sintered and formed grain boundaries increases their contribution to resistance. Since grain boundaries have higher activation energy than the bulk, activation energy increases with increasing LLZO weight fractions beyond the optimum concentration. Hence, increasing weight fractions of LLZO show an increased resistance arising from cold pressing and sample porosity. The sample porosity is evident under SEM where the images as shown in FIGS. 1(c) and 1(d) clearly indicate the composite membranes with minimal porosity while the LLZO sample contains considerable porosity (FIG. 1a). The blank LPS sample is the least porous of all samples. Thus, further reduction in porosity of the composite samples can enhance the measured conductivities.

Figure 4:
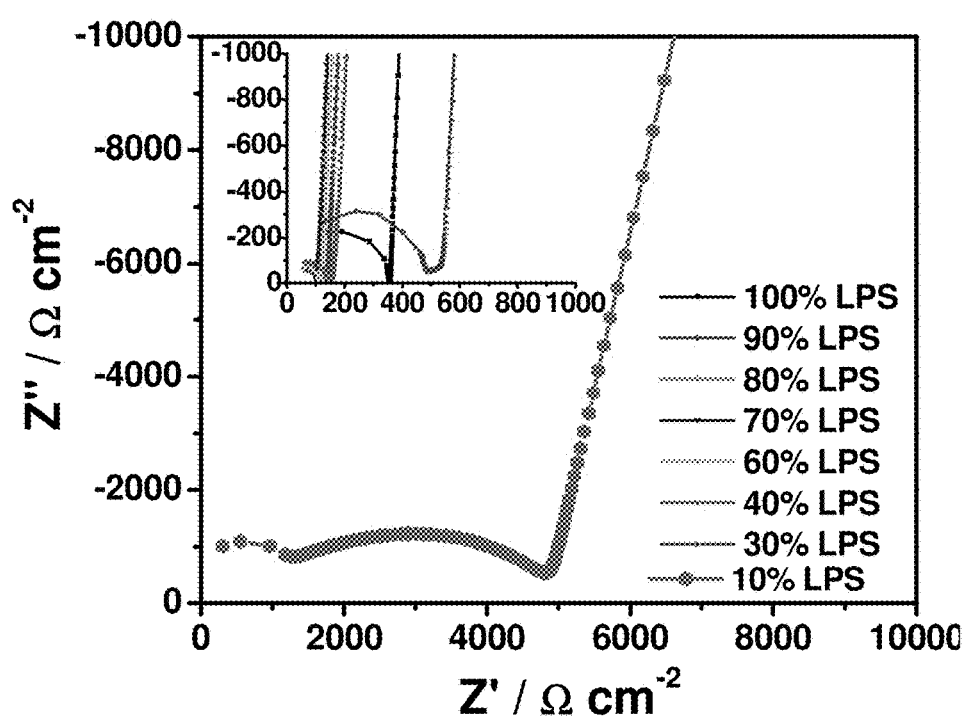
FIG. 4 is room temperature Nyquist data for a 10:90 LPS:LLZO mixture resolving the contribution from the space charge layer in comparison (inset plot).

The Rietveld refinement shows that there is no secondary phase formation in the composite. The composite electrolyte has an ionic conductivity higher than the parent compounds, which are superionic conductors. The enhancement is from the interface between LLZO and LPS, since it is the only addition to the bulk LLZO and LPS within the composite system. FIG. 4 is room temperature Nyquist data for the 10:90 LPS:LLZO mixture resolving the contribution from the space charge layer in comparison (inset plot) with the remaining compositions exhibiting a single component behavior. A detailed examination of the Nyquist plots in FIG. 4 reveals a subtle change in behavior at the 10:90 composition of LPS:LLZO. Unlike the other compositions, this mixture exhibits two semi-circular regions indicating a higher conducting and a lower conducting component. Since both the LPS and LLZO typically present a single component, the dual component behavior is induced by the interfacial layer. At the aforementioned composition, the bulk matrix is still occupied by the porous non-dense LLZO that results in a low conductivity. However, the presence of 10 wt. % LPS is significant enough to improve the ionic conductivity by two orders of magnitude over the blank LLZO ($6.03 \times 10^{-6}$ S cm$^{-1}$ vs. $5.18 \times 10^{-8}$ S cm$^{-1}$). The addition of this minor fraction of LPS results in an interfacial layer significant enough to improve the total conductivity but still limited by the sample porosity and grain boundary resistance. Thus the resulting Nyquist data is able to resolve the contributions from the interfacial layer. At the higher conducting compositions, the data is limited by the high frequency limits of the impedance analyzer from resolving these interfacial contributions.

The interface of the LLZO and LPS leads to the formation of a layer of ionic and electronic point defects, termed the space-charge layer. A space-charge layer can significantly enhance the ionic conductivity of solid state electrolyte mixtures depending on its nature. Higher ionic conductivities have been achieved in a $Li_4GeS_4$—$Li_3PS_4$ composite system utilizing the space charge effect.[18] It is possible that the space-charge layer of the LLZO-LPS composite is similar to that of the $Li_4GeS_4$—$Li_3PS_4$ composite. An enhanced ionic conductivity is explained by the space charge layer effect. In addition, the phase of the LLZO is important to the overall conductivity of the composite electrolyte. A control sample was prepared by using the lower conducting tetragonal phase of LLZO. The resulting composite electrolyte of the tetragonal LLZO with LPS has a 5-fold drop in ionic conductivity, $5.21 \times 10^{-5}$ S cm$^{-1}$ as against $2.6 \times 10^{-4}$ S cm$^{-1}$ observed with cubic LLZO for the 50:50 composition. This confirms that a high conduction phase of LLZO favors the overall conductivity of the composite.

Figure 5:
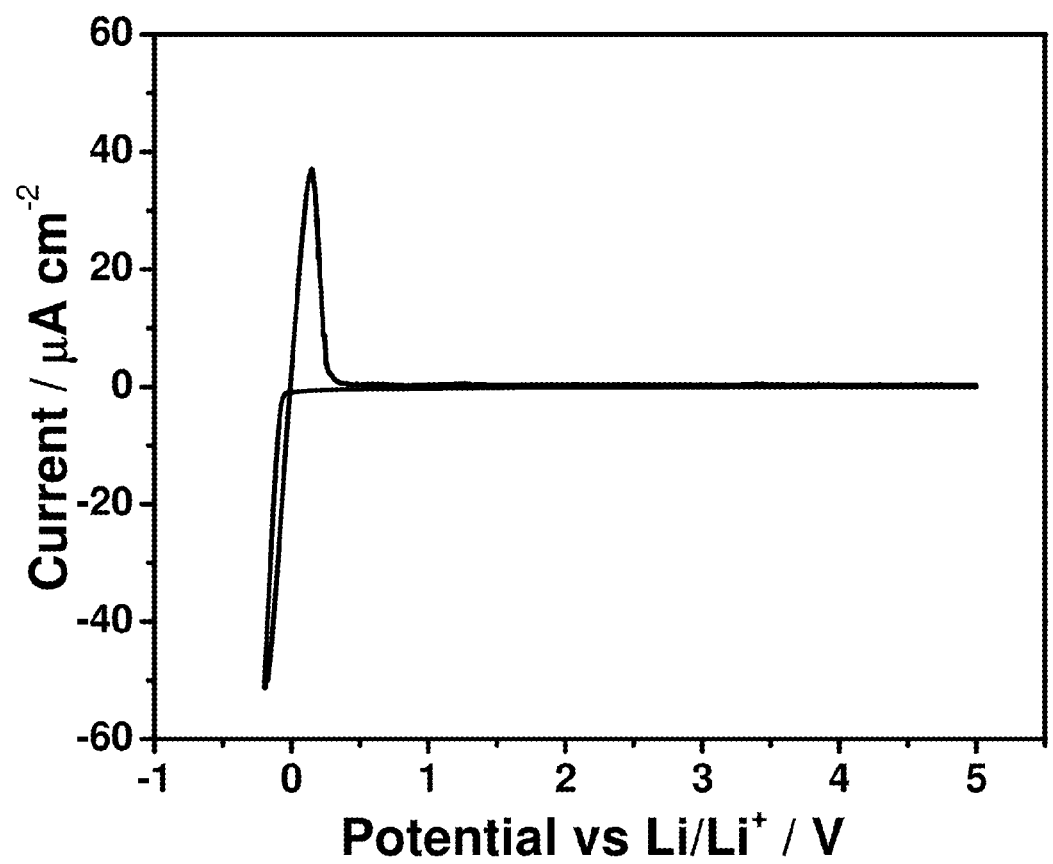
FIG. 5 is a cyclic voltammetry measurement of a Pt/LLZO-LPS/Li cell.

The composite electrolyte of the invention exhibits excellent electrochemical stability and cyclability. The electrochemical stability of the composite was investigated using Cyclic Voltammetry (FIG. 5). FIG. 5 is a cyclic voltammetry measurement of a Pt/LLZO-LPS/Li cell which demonstrates a wide electrochemical window of 5V versus metallic lithium. The composite is stable up to a potential of 5 V vs. Li/Li$^+$ as observed for its parent electrolytes. Additionally, the anodic current is present only below 0 V vs. Li/Li$^+$ (arising from electrodeposition of Li) thus confirming the stability of the composite electrolyte with metallic Li.

Figure 6:
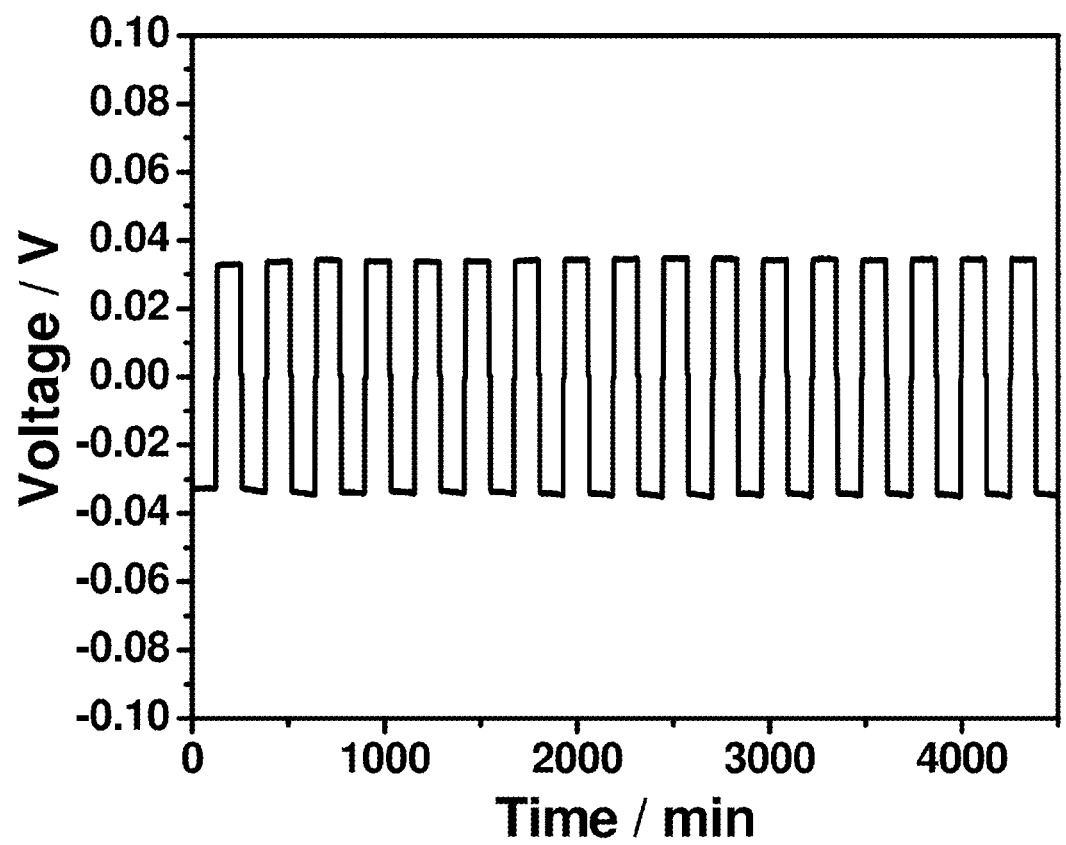
FIG. 6 is representative cycling data of a Li/LPS-LLZO/Li symmetric cell at a current density of 0.1 mA $cm^{-2}$ and room temperature.

A symmetric cell was fabricated with Li/LPS-LLZO/Li setup to demonstrate excellent stability and cyclability of the composite electrolyte with metallic Li. A minimal polarization of 32.9 mV was observed under a current density of 0.1 mA cm$^{-2}$ at ambient conditions (25° C.). The direct-current (DC) conductivity of the full cell was calculated to be $3.36 \times 10^{-4}$ S cm$^{-1}$ in comparison with the ionic conductivity of the electrolyte measured at $5.36 \times 10^{-4}$ S cm$^{-1}$ using EIS. The total DC conductivity includes interfacial resistances from two Li/LLZO-LPS interfaces. The resistance at the interface is lower than that of the composite electrolyte. This fact clearly indicates that the lithium-ion transport in the symmetric cell is not kinetically limited at the interface. The composite electrolyte exhibited a lower polarization than that was observed for the pure electrolytes of LPS. The low interfacial resistance is in contrast to the high interfacial resistances for the LLZO system. The composite electrolyte shows an interfacial property superior to its parent compounds. Excellent cycling performance was achieved in the symmetric cell. FIG. 6 is representative cycling data of a Li/LPS-LLZO/Li symmetric cell at a current density of 0.1 mA cm$^{-2}$ and room temperature. The commonly observed voltage spikes and cell shorting in some less conductive solid electrolytes or defective membranes were not observed in the Li/LLZO-LPS/Li symmetric cell after a few hundred cycles. These observations provide additional evidence of a high compatibility of the composite electrolyte with metallic lithium and good processability of the material through cold-pressing. All cycles have flat voltage profile, which demonstrated an exceptional stability of symmetric cycles.

The composite electrolyte of the invention successfully combines and enhances the properties of its parent electrolytes. The soft sulfide imparts an excellent mechanical property to the composite and overcomes the processability barrier of the hard oxide electrolytes. Dense electrolyte membranes can be prepared through cold-pressing. The improved processability can facilitate the use of ceramic solid electrolytes in practical batteries. The composite electrolyte has higher Li-ion conductivity than that of its parent electrolytes. The enhanced ionic conductivity is believed as an effect of the space charge layer formed at the interfaces of LLZO and LPS particles. The composite electrolyte has an excellent electrochemical stability and also succeeds in achieving low interfacial resistance with metallic Li anode. The concept of compositing oxides with sulfides to achieve improved mechanical properties, ionic conductivity, and electrochemical properties of existing solid electrolytes opens an avenue for the discovery of new materials that are enablers for future all-solid state batteries. Large scale energy storage needs batteries with high energy and inherent safety. All-solid state batteries meet these needs.

Figure 7:
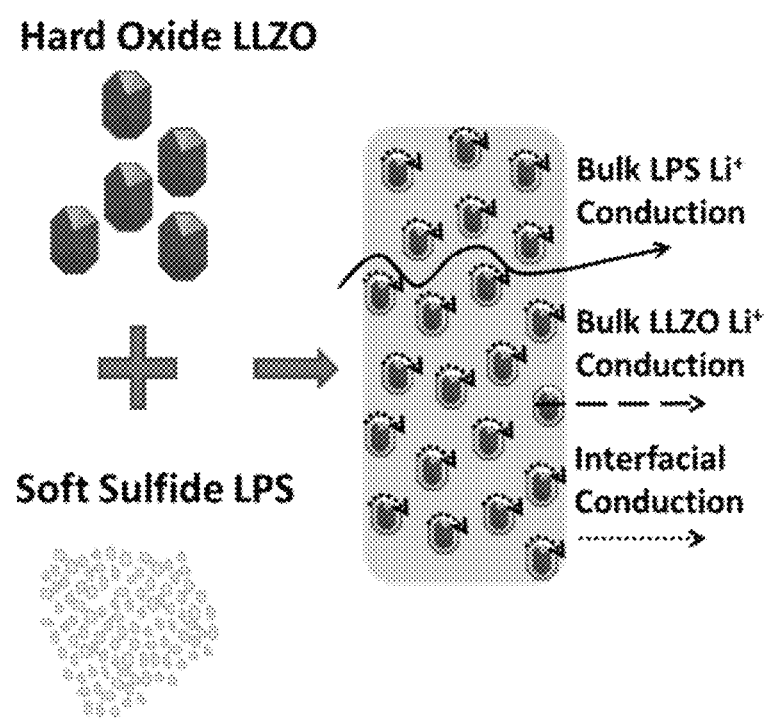
FIG. 7 is a schematic diagram illustrating the production of a solid electrolyte according to a method of the invention.

The solid electrolyte of the invention can be produced by many different methods. FIG. 7 is a schematic diagram illustrating the production of a solid electrolyte according to a method of the invention. The hard oxide and soft sulfide are combined by suitable processes. The composite material is then shaped into a suitable solid electrolyte and a battery cell can be formed with the solid electrolyte by suitable methods such as dry-powder pressing or solution based coating.

This invention can be embodied in other forms without departing from the spirit or essential attributes thereof, and accordingly reference should be made to the following claims to determine the scope of the invention.

We claim:

1. A solid electrolyte layer for positioning between the anode and cathode of a lithium sulfur battery, comprising particles of a lithium ion conducting oxide composition embedded within a lithium ion conducting sulfide composition.

2. The solid electrolyte layer of claim 1, wherein the lithium ion conducting oxide composition comprises $Li_7La_3Zr_2O_{12}$ (LLZO).

3. The solid electrolyte layer of claim 1, wherein the lithium ion conducting sulfide composition comprises $\beta$-$Li_3PS_4$ (LPS).

4. The solid electrolyte layer of claim 1, wherein the lithium conducting oxide composition is at least one selected from the group consisting of (i) perovskite-type oxides; (ii) NASICON-structured lithium electrolytes; and (iii) garnet-type structures containing transition metal oxides.

5. The solid electrolyte layer of claim 4, wherein the (i) perovskite-type oxides comprise $(Li,La)TiO_3$; the (ii) NASICON-structured lithium electrolytes comprise $LiM_{IV2}(PO_4)_3$ (MIV=Ti, Zr, Ge); and the (iii) garnet-type structures containing transition metal oxides comprise $Li_5La_3M_2O_{12}$ (M=transition metal).

6. The solid electrolyte layer of claim 1, wherein the lithium ion conduction sulfide composition is at least one selected from the group consisting of $Li_2S$—$P_2S_5$ glass or glass-ceramic, $Li_2S$—$P_2S_5$—$Li_4SiO_4$ glass, $Li_2S$—$SiS_2$ glass, $Li_2S$—$Ga_2S_3$—$GeS_2$ glass, $Li_2S$—$Sb_2S_3$—$GeS_2$ glass, $Li_2S$—$GeS_2$—$P_2S_5$ glass, $Li_{10}GeP_2S_{12}$, $Li_{10}SnP_2S_{12}$, and $Li_2S$—$SnS_2$—$As_2S_5$ glass or glass-ceramic.

7. The solid electrolyte layer of claim 1, wherein the lithium ion conducting oxide composition comprises $Li_7La_3Zr_2O_{12}$ (LLZO), and the lithium ion conducting sulfide composition comprises $\beta$-$Li_3PS_4$ (LPS).

8. The solid electrolyte layer of claim 1, wherein the lithium ion conducting oxide particles form a core and are coated by a shell of the lithium ion conducting sulfide composition.

9. The solid electrolyte layer of claim 1, wherein the lithium ion conducting oxide composition comprises between 1-99 weight % and the lithium ion conducting sulfide composition comprises between 1-99 weight % based on the total weight of the electrolyte.

10. The solid electrolyte layer of claim 1, wherein the particles of lithium ion conducting oxide composition are between 0.001 and 50 microns in largest diameter.

11. The solid electrolyte layer of claim 1, wherein the lithium ion conductivity of the solid electrolyte layer is greater than the expected lithium ion conductivity of the lithium ion conducting oxide composition and the lithium ion conducting sulfide composition.

12. A lithium sulfur battery, comprising:
an anode comprising lithium;
a cathode comprising sulfur:
a solid electrolyte layer between the anode and the cathode, the solid electrolyte layer comprising particles of a lithium ion conducting oxide composition embedded within a lithium ion conducting sulfide composition.

13. The lithium battery of claim 12, wherein the lithium ion conducting oxide composition comprises $Li_7La_3Zr_2O_{12}$ (LLZO).

14. The lithium battery of claim 12, wherein the lithium ion conducting sulfide composition comprises $\beta$-$Li_3PS_4$ (LPS).

15. The lithium battery of claim 12, wherein the lithium conducting oxide composition is at least one selected from the group consisting of (i) perovskite-type oxides; (ii) NASICON-structured lithium electrolytes; and (iii) garnet-type structures containing transition metal oxides.

16. The lithium battery of claim 15, wherein the (i) perovskite-type oxides comprise $(Li,La)TiO_3$; the (ii) NASICON-structured lithium electrolytes comprise $LiM_{IV2}(PO_4)_3$ (MIV=Ti, Zr, Ge); and the (iii) garnet-type structures containing transition metal oxides comprise $Li_5La_3M_2O_{12}$ (M=transition metal).

17. The lithium battery of claim 12, wherein the lithium ion conduction sulfide composition is at least one selected from the group consisting of $Li_2S$—$P_2S_5$ glass or glass-ceramic, $Li_2S$—$P_2S_5$—$Li_4SiO_4$ glass, $Li_2S$—$SiS_2$ glass, $Li_2S$—$Ga_2S_3$—$GeS_2$ glass, $Li_2S$—$Sb_2S_3$—$GeS_2$ glass, $Li_2S$—$GeS_2$—$P_2S_5$ glass, $Li_{10}GeP_2S_{12}$, $Li_{10}SnP_2S_{12}$, and $Li_2S$—$SnS_2$—$As_2S_5$ glass or glass-ceramic.

18. The lithium battery of claim 12, wherein the lithium ion conducting oxide composition comprises $Li_7La_3Zr_2O_{12}$ (LLZO), and the lithium ion conducting sulfide composition comprises $\beta$-$Li_3PS_4$ (LPS).

19. The lithium battery of claim 12, wherein the lithium ion conducting oxide particles form a core and are coated by a shell of the lithium ion conducting sulfide composition.

20. The lithium battery of claim 12, wherein the lithium ion conducting oxide composition comprises between 1-99 weight % and the lithium ion conducting sulfide composition comprises between 1-99 weight % based on the total weight of the electrolyte.

21. The lithium battery of claim 12, wherein the particles of lithium ion conducting oxide composition are between 0.001 and 50 microns.

22. The lithium battery of claim 12, wherein the cathode comprises sulfur, sulfur compounds, transition metal oxides, and transition metal phosphates.

23. The lithium sulfur battery of claim 12, wherein the lithium ion conductivity of the solid electrolyte layer is greater than the expected lithium ion conductivity of the lithium ion conducting oxide composition and the lithium ion conducting sulfide composition.

24. A method of making a lithium battery, comprising the steps of:
providing a lithium ion conducting oxide composition;
providing a lithium ion conducting sulfide composition;
embedding the lithium ion conducting oxide particles within the lithium ion conducting sulfide composition; and,
forming a solid electrolyte comprising the lithium ion conducting oxide particles and the lithium ion conducting sulfide composition.

25. The method of claim 24, further comprising the steps of interposing the solid electrolyte between an anode comprising lithium and a cathode comprising sulfur.

26. The method of claim 24, wherein the lithium ion conducting oxide composition comprises $Li_7La_3Zr_2O_{12}$ (LLZO), and the lithium ion conducting sulfide composition comprises $\beta$-$Li_3PS_4$ (LPS).

27. The method of claim 24, wherein the lithium conducting oxide composition is at least one selected from the group consisting of (i) perovskite-type oxides; (ii) NASICON-structured lithium electrolytes; and (iii) garnet-type structures containing transition metal oxides.

28. The method of claim 27, wherein the (i) perovskite-type oxides comprise $(Li,La)TiO_3$; the (ii) NASICON-structured lithium electrolytes comprise $LiM_{IV2}(PO_4)_3$ (MIV=Ti, Zr, Ge); and the (iii) garnet-type structures containing transition metal oxides comprise $Li_5La_3M_2O_{12}$ (M=transition metal).

29. The method of claim 24, wherein the lithium ion conduction sulfide composition is at least one selected from the group consisting of $Li_2S$—$P_2S_5$ glass or glass-ceramic, $Li_2S$—$P_2S_5$—$Li_4SiO_4$ glass, $Li_2S$—$SiS_2$ glass, $Li_2S$—$Ga_2S_3$—$GeS_2$ glass, $Li_2S$—$Sb_2S_3$—$GeS_2$ glass, $Li_2S$—$GeS_2$—$P_2S_5$ glass, $Li_{10}GeP_2S_{12}$, $Li_{10}SnP_2S_{12}$, and $Li_2S$—$SnS_2$—$As_2S_5$ glass or glass-ceramic.

30. The method of claim 24, wherein the lithium ion conducting oxide composition comprises between 1-99 weight % and the lithium ion conducting sulfide composition comprises between 1-99 weight % based on the total weight of the electrolyte.

\* \* \* \* \*